United States Patent
Yoon et al.

(10) Patent No.: US 10,800,046 B2
(45) Date of Patent: Oct. 13, 2020

(54) LINEAR EXTENSION AND RETRACTION MECHANISM, AND ROBOT ARM MECHANISM EQUIPPED WITH SAME

(71) Applicant: LIFE ROBOTICS INC., Tokyo (JP)

(72) Inventors: Woo-Keun Yoon, Tokyo (JP); Hiroaki Matsuda, Tokyo (JP)

(73) Assignee: LIFE ROBOTICS INC., Tokyo (JP)

( * ) Notice: Subject to any disclaimer, the term of this patent is extended or adjusted under 35 U.S.C. 154(b) by 226 days.

(21) Appl. No.: 16/115,763

(22) Filed: Aug. 29, 2018

(65) Prior Publication Data
US 2018/0361597 A1 Dec. 20, 2018

Related U.S. Application Data

(63) Continuation of application No. PCT/JP2017/006718, filed on Feb. 23, 2017.

(30) Foreign Application Priority Data

Feb. 29, 2016 (JP) .................. 2016-038461

(51) Int. Cl.
*B25J 18/02* (2006.01)
*F16G 13/20* (2006.01)
(Continued)

(52) U.S. Cl.
CPC ......... *B25J 18/025* (2013.01); *B25J 17/0283* (2013.01); *B25J 18/02* (2013.01);
(Continued)

(58) Field of Classification Search
CPC ...... B25J 18/025; B25J 17/0283; B25J 18/02; B25J 18/04; B25J 19/1035; B25J 15/0019; F16G 13/20
See application file for complete search history.

(56) References Cited

U.S. PATENT DOCUMENTS 10,661,452 B2 * 5/2020 Yoon .................. F16G 13/20
2004/0058765 A1 * 3/2004 Kubein-Meesenburg ..................
F16G 13/20
474/206
(Continued)

FOREIGN PATENT DOCUMENTS

| JP | 2009-196059 A | 9/2009 |
| JP | 2009-220219 A | 10/2009 |
| WO | 2015-137171 A1 | 9/2015 |

OTHER PUBLICATIONS

International Search Report issued in PCT/JP2017/006718 dated Mar. 28, 2017 with English Translation (4 pages).
(Continued)

*Primary Examiner* — David M Fenstermacher
(74) *Attorney, Agent, or Firm* — Nakanishi IP Associates, LLC

(57) ABSTRACT

A linear extension and retraction mechanism includes a plurality of flat-plate shaped first pieces that are connected to each other, and a plurality of second pieces having a cross-sectional U-shaped groove frame shape that are connected to each other. A leading first piece of the plurality of first pieces and a leading second piece of the plurality of second pieces are joined by a head section. The first and second pieces become linearly rigid when the first pieces are joined to an upper part of the second pieces, and the first and second pieces return to a bent state when separated from each other. Protrusion sections that protrude inward are extended in the width direction in a bottom plate of each second piece. Corners of edge parts of the protrusion sections are chamfered.

6 Claims, 8 Drawing Sheets

(51) Int. Cl.
*B25J 17/02* (2006.01)
*B25J 18/04* (2006.01)
B25J 9/10 (2006.01)
B25J 15/00 (2006.01)

(52) U.S. Cl.
CPC .............. *B25J 18/04* (2013.01); *F16G 13/20* (2013.01); *B25J 9/1035* (2013.01); *B25J 15/0019* (2013.01)

(56) References Cited

U.S. PATENT DOCUMENTS

| | | | | |
|---|---|---|---|---|
| 2012/0024091 A1* | 2/2012 | Kawabuchi | ............. | B25J 18/06 74/37 |
| 2013/0068061 A1* | 3/2013 | Yoon | ...................... | B25J 18/025 74/490.05 |
| 2016/0375591 A1* | 12/2016 | Yoon | ................... | H02G 11/006 74/490.05 |
| 2017/0266819 A1* | 9/2017 | Yoon | ........................ | B25J 18/02 |
| 2017/0291311 A1* | 10/2017 | Yoon | ....................... | F16G 13/20 |
| 2017/0297205 A1* | 10/2017 | Takase | ..................... | B25J 19/06 |
| 2017/0320218 A1* | 11/2017 | Yoon | ....................... | B25J 18/02 |
| 2018/0093383 A1* | 4/2018 | Yoon | ....................... | B25J 18/02 |
| 2018/0207812 A1* | 7/2018 | Yoon | ....................... | B25J 18/02 |
| 2018/0272544 A1* | 9/2018 | Yoon | ....................... | F16G 13/20 |
| 2018/0361597 A1* | 12/2018 | Yoon | ..................... | B25J 18/025 |
| 2019/0030734 A1* | 1/2019 | Yoon | ................... | F16H 19/0645 |
| 2019/0032757 A1* | 1/2019 | Yoon | ....................... | F16H 19/02 |
| 2019/0032758 A1* | 1/2019 | Yoon | ................... | F16H 19/0645 |
| 2019/0054613 A1* | 2/2019 | Shibata | ....................... | B25J 9/06 |

OTHER PUBLICATIONS

Written Opinion of International Searching Authority issued in PCT/JP2017/006718 dated Mar. 28, 2017 (3 pages).

* cited by examiner

LINEAR EXTENSION AND RETRACTION MECHANISM, AND ROBOT ARM MECHANISM EQUIPPED WITH SAME

CROSS-REFERENCE TO RELATED APPLICATIONS

This application is a continuation application of International Patent Application No. PCT/JP2017/006718 filed on Feb. 23, 2017, which is based upon and claims the benefit of priority from the Japanese Patent Application No. 2016-038461, filed Feb. 29, 2016 the entire contents of which are incorporated herein by reference.

FIELD

An embodiment described herein relates generally to a linear extension and retraction mechanism and to a robot arm mechanism that is equipped with the linear extension and retraction mechanism.

BACKGROUND

Conventionally, articulated robot arm mechanisms are used in various fields such as the field of industrial robots. The present inventors achieved practical application of a linear extension and retraction mechanism. A linear extension and retraction mechanism is a structure that makes an elbow joint unnecessary and realizes the elimination of singular points, and is thus a structure that will be extremely useful from now on.

The linear extension and retraction mechanism is constituted by a plurality of flat-plate shaped pieces that are bendably connected and a plurality of pieces having an U-shaped groove frame shape that are similarly bendably connected on a bottom side, and a columnar arm section that is made linearly rigid and has a certain rigidity is constituted by these two types of pieces joining together. When a motor of the linear extension and retraction mechanism rotates forward, the arm section in the shape of a columnar body is sent out from an arm support section, and when the motor rotates backward the arm section is pulled back. The joined state of the pieces is released at the rear of the arm support section, and the pieces return from the rigid state to a bent state. The two types of pieces that returned to the bent state are bent to the bottom side of one of the types of pieces and are housed inside a columnar support section. A wrist section is attached to the tip of the arm section. Three joints that have three axes of rotation that are orthogonal to each other for arbitrarily changing the posture of an end effector are provided in the wrist section.

Electrical cables are connected to the three joints provided in the wrist section. The electrical cables are utilized to supply power required foractuating the three joints and to also supply control signals thereto. It is necessary to adopt a design which ensures that these electrical cables do not interfere with the motions of the robot arm mechanism, and that suppresses the occurrence of damage to the electrical cables.

SUMMARY OF INVENTION

Technical Problem

A purpose of the present invention is to reduce interference with respect to extension and retraction motions of a linear extension and retraction mechanism that is caused by an electrical cable that is used to supply electric power or control signals to a joint mounted in a wrist section in the linear extension and retraction mechanism, and to also suppress the occurrence of damage to the electrical cable.

Solution to Problem

The linear extension and retraction mechanism according to the present embodiment includes a plurality of first pieces having a flat-plate shape, and a plurality of second pieces having a cross-sectional U-shaped groove frame shape. The first pieces are bendably connected to each other at front and rear ends. The second pieces are bendably connected to each other at front and rear ends of a bottom plate. A leading first piece of the plurality of first, pieces and a leading second piece of the plurality of second pieces are joined by a head section. The upper part of the second pieces, and the first and second pieces return to a bent state when separated from each other. A support section supports the first and second pieces movably to front and rear, and causes the first and second pieces to join when the first and second pieces move frontward, and causes the first and second pieces to separate when the first and second pieces move rearward. A protrusion section that protrudes inward is extended in a width direction in a bottom plate of each second piece. A corner of an edge part of the protrusion section is chamfered.

DETAILED DESCRIPTION

Hereinafter, a linear extension and retraction mechanism according to the present embodiment is described with reference to the accompanying drawings. Note that, although the linear extension and retraction mechanism according to the present embodiment can be used as an independent mechanism (joint), herein a polar-coordinate type robot arm mechanism in which one joint among a plurality of joints is constituted by the linear extension and retraction mechanism according to the present embodiment is described as an example.

Figure 1:
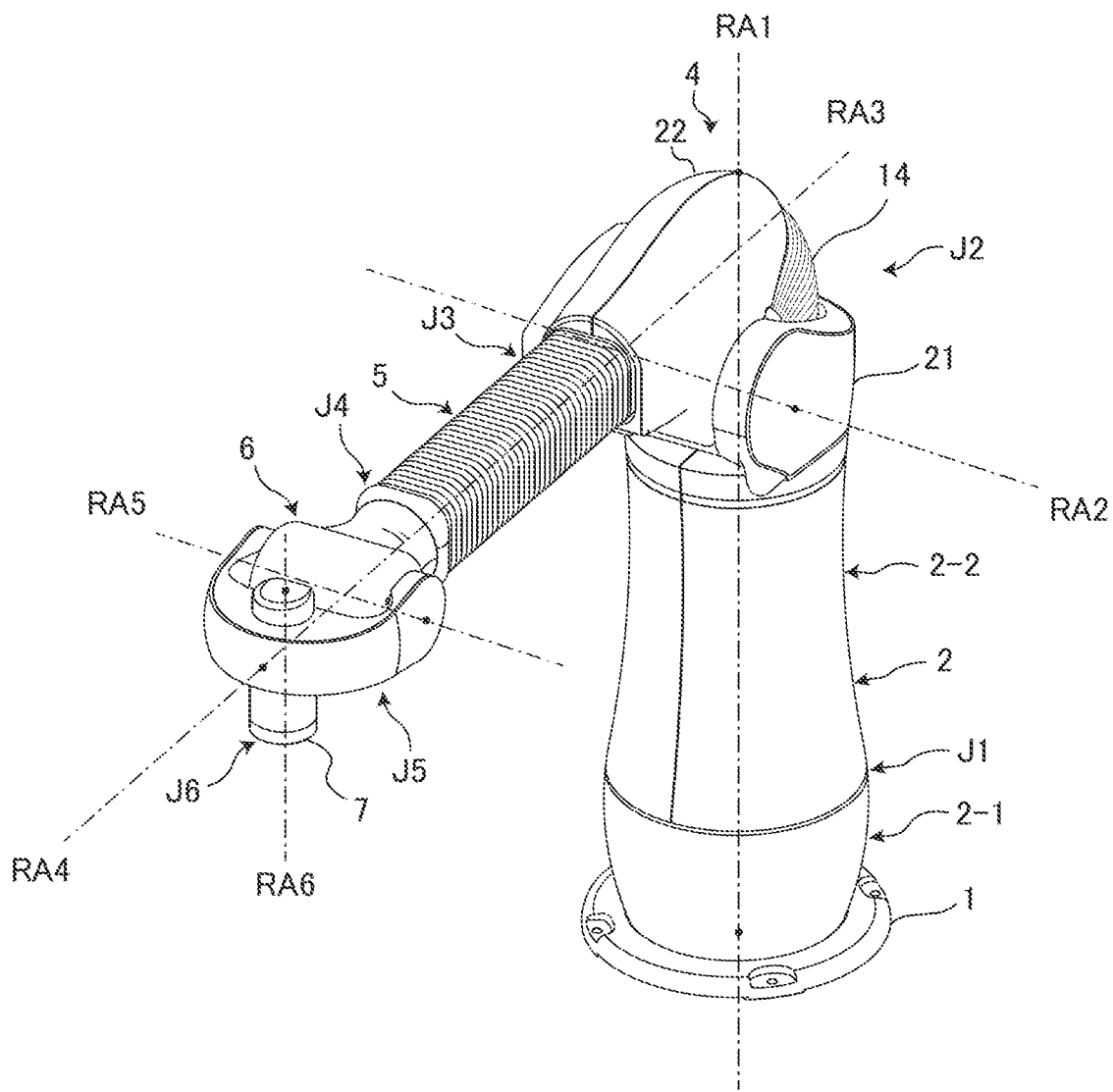
FIG. 1 is an external perspective view of a robot arm mechanism equipped with a linear extension and retraction mechanism according to the present embodiment.
Figure 2:
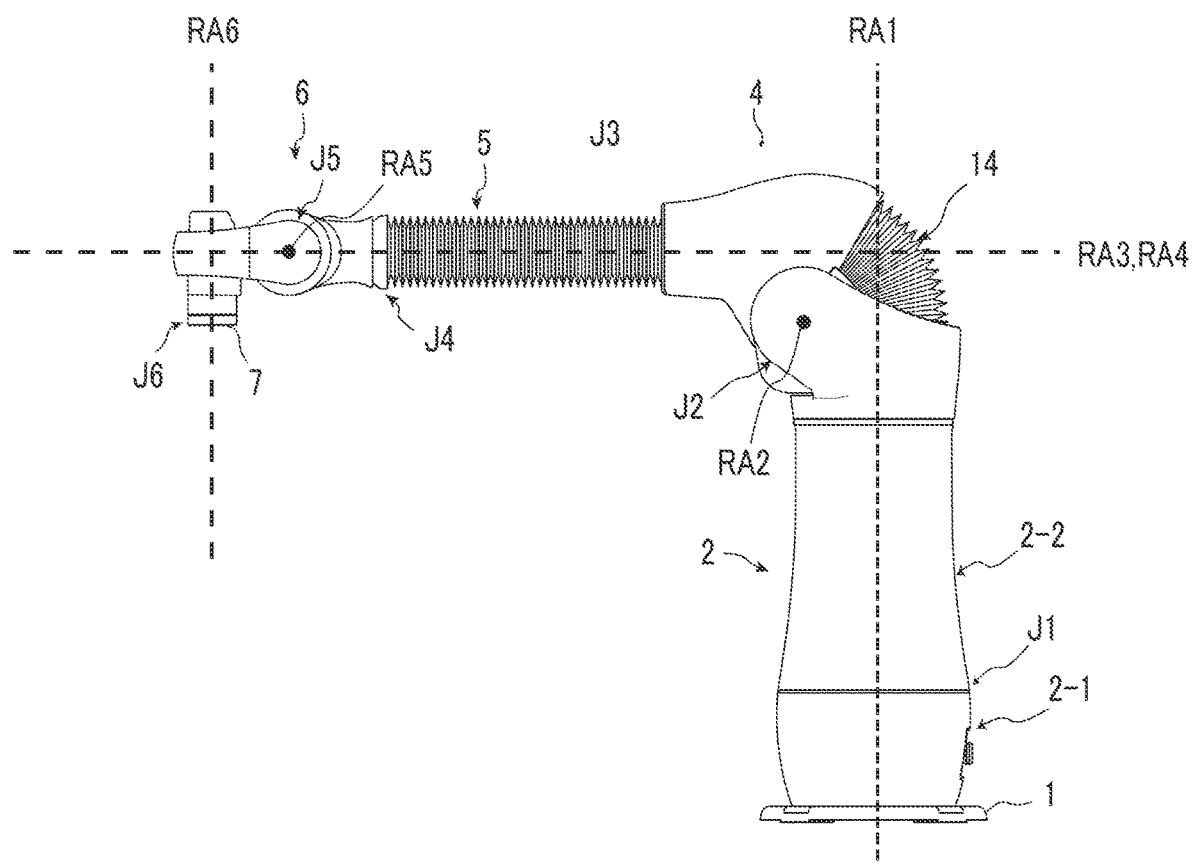
FIG. 2 is a side view of the robot arm mechanism shown in FIG. 1.
Figure 3:
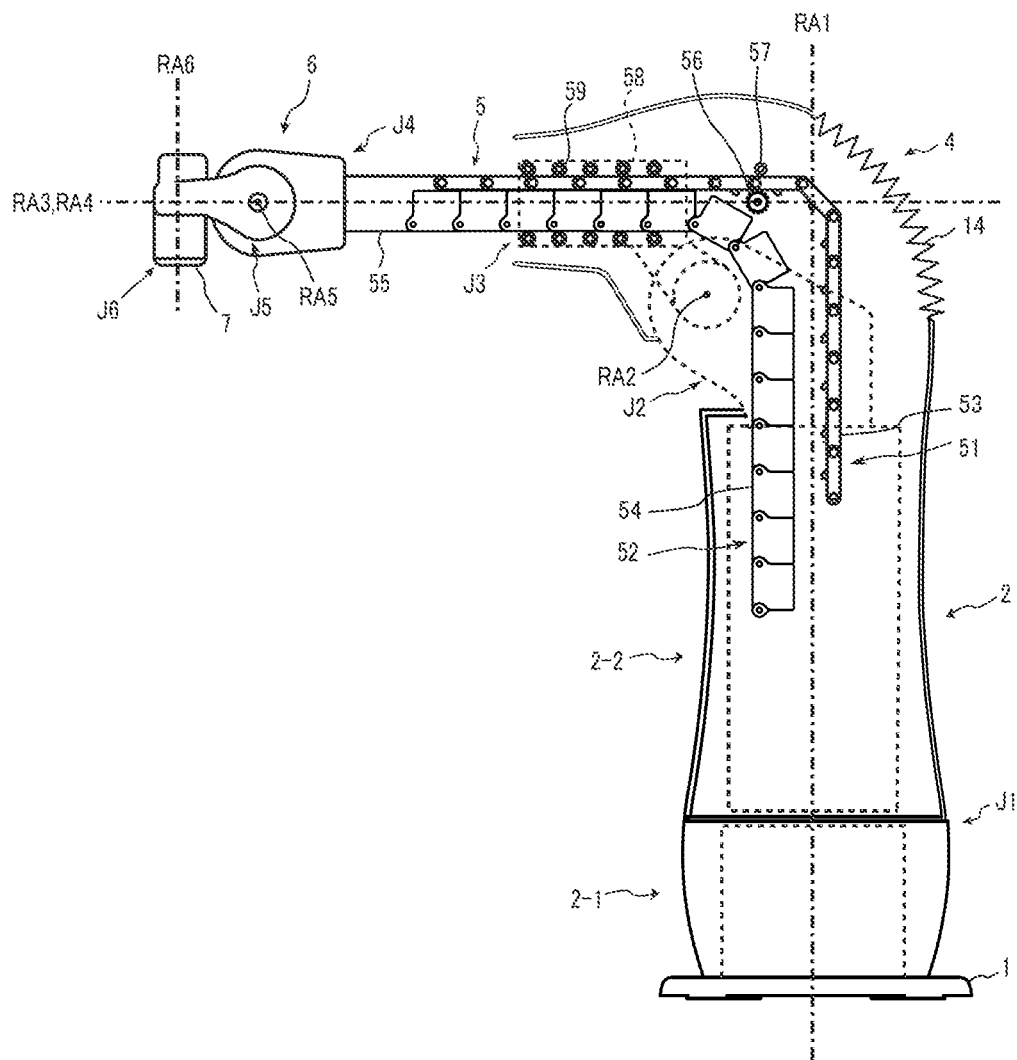
FIG. 3 is a view illustrating an internal structure of the robot arm mechanism in FIG. 1.
Figure 4:
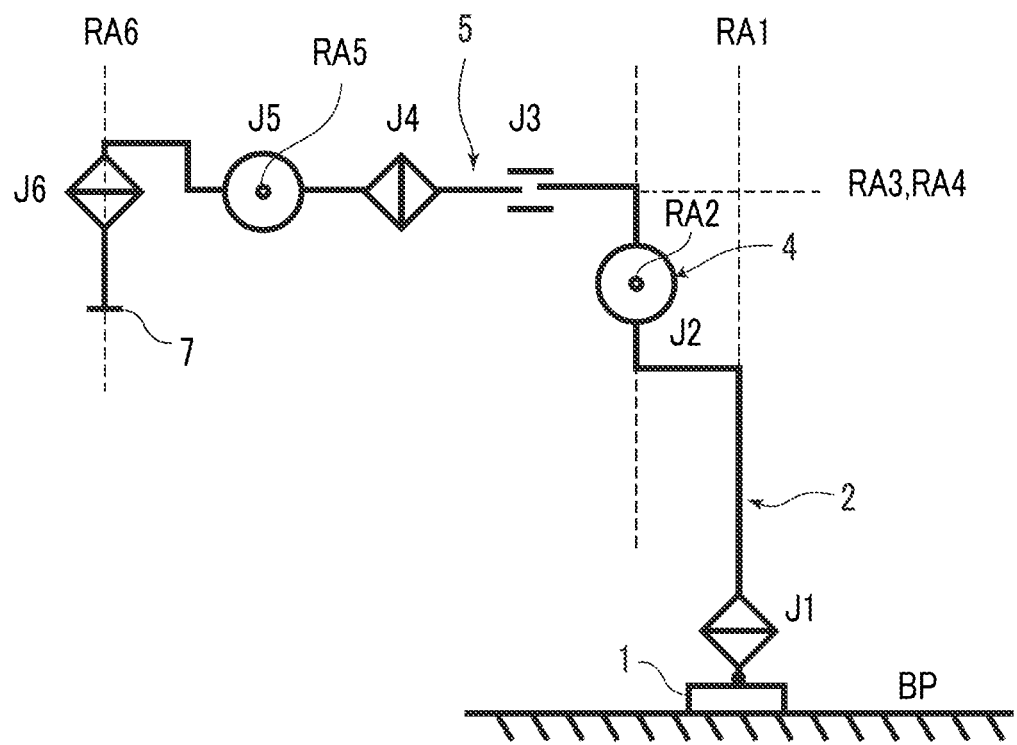
FIG. 4 is a view illustrating the robot arm mechanism in FIG. 1 by representation with graphic symbols.

FIG. 1 and FIG. 2 are external views of a robot arm mechanism equipped with the linear extension and retraction mechanism according to the present embodiment. FIG. 3 illustrates the internal structure of the linear extension and retraction mechanism. In FIG. 4, the robot arm mechanism is represented with graphic symbols. The robot arm mechanism includes a plurality of (herein, six) joints J1, J2, J3, J4, J5 and J6. The plurality of the joints J1, J2, J3, J4, J5 and J6 are arranged in order from a base 1. Generally, a first, second and third joint J1, J2 and J3 are called root three axes, and a fourth, fifth and sixth joint J4, J5 and J6 are called wrist three axes for mainly changing the posture of an end effector. At least one of the joints J1, J2 and J3 constituting the root three axes is a linear extension and retraction mechanism. Herein, the third joint J3 is formed as a linear extension and retraction mechanism.

The first joint J1 is a torsion joint that rotates on a first axis of rotation RA1 which is perpendicular to a ground plane of the base 1. The second joint J2 is a bending joint that rotates on a second axis of rotation RA2 perpendicular to the first axis of rotation RA1. The third joint J3 is a linear extension and retraction mechanism with which an arm section 5 linearly extends or contracts along a third axis (axis of movement) RA3 perpendicular to the second axis of rotation RA2. The fourth joint J4 is a torsion joint that rotates on a fourth axis of rotation RA4 which approximately matches the third axis of movement RA3. The fifth joint J5 is a bending joint that rotates on a fifth axis of rotation RA5 perpendicular to the fourth axis of rotation RA4. The sixth joint J6 is a bending joint that rotates on a sixth axis of rotation RA6 perpendicular to the fourth axis of rotation RA4 and the fifth axis of rotation RA5.

A columnar support section 2 forming a cylindrical body is installed on the base 1 of the robot arm mechanism. The columnar support section 2 houses the first joint J1. The first joint J1 has a axis of rotation RA1. The axis of rotation RA1 is, for example, parallel to the vertical direction. The arm section 5 turns horizontally by rotation of the first joint J1. The columnar support section 2 includes a column lower part 2-1 and a column upper part 2-2. The column lower part 2-1 is connected to a fixed section of the first joint J1. The column upper part 2-2 is connected to a rotating section of the first joint 41, and axially rotates on the axis of rotation RA1. First and second piece strings 51 and 52 of the third joint J3 that are described later are housed in an inner hollow of the columnar support section 2 that forms a cylindrical body. An up/down section 4 that houses the second joint J2 is installed in the column upper part 2-2. The axis of rotation RA2 of the second joint J2 is, for example, horizontal. The second joint J2 is installed in the column upper part 2-2. The arm section 5 rotates upward and downward vertically by rotation of the second joint J2.

The linear extension and retraction mechanism constituting the third joint J3 is equipped with a structure that was newly developed by the present inventors, and is clearly distinguished from a conventional solid linear motion joint for which the linear motion range is limited and which has a retraction range that is the same length as the linear motion range. By means of the third joint J3, the arm section (columnar body) 5 extends and contracts to the front and rear along the center axis (extension and contraction center axis RA3) thereof in a state in which the arm section 5 maintains linear rigidity. The arm section 5 has a first piece string 51 and a second piece string 52. The first piece string 51 includes a plurality of first pieces 53 that are bendably connected. As illustrated in FIG. 5, the first pieces 53 are formed in a substantially flat plate shape. The second piece string 52 includes a plurality of second pieces 54 that are bendably connected. As illustrated in FIG. 6, each second piece 54 forms a groove frame-like body having an U-shape in transverse section. The second pieces 54 are bendably connected to each other at bottom plates thereof. Bending of the second piece string 52 is restricted at positions at which end faces of side plates of the second pieces 54 butt against each other. At such positions, the second piece string 52 is linearly arranged. A leading first piece 53 of the first piece string 51 and a leading second piece 54 of the second piece string 52 are connected by a head piece 55. For example, the head piece 55 has a shape that integrates the second piece 54 and the first piece 53.

The first and second piece strings 51 and 52 are pressed by upper and lower rollers 59 of a support section (roller unit) 58 having a rectangular cylindrical shape, and are thereby joined together. The first and second piece strings 51 and 52 joined together constitute the columnar arm section 5. A drive gear (pinion) 56 is provided to the rear of the support section 58. The drive gear 56 is connected to a motor (unshown) through a decelerator. As illustrated in FIG. 5B, a linear gear 239 is formed along the connecting direction at the width center of an inner wall of the first piece 53. The linear gears 239 which are adjacent when a plurality of the first pieces 53 are linearly aligned are connected linearly and constitute a long linear gear (rack). The drive gear (pinion) 56 is meshed with the linear gears 239 having the linear shape. The linear gears 239 that are connected linearly constitute a rack-and-pinion mechanism together with the drive gear 56. When the drive gear 56 rotates forward, the arm section 5 extends forward. When the drive gear 56 rotates backward, the arm section 5 is pulled back inside the up/down section 4 and contracts. When the first and second piece strings 51 and 52 are pulled back as far as the rear of the support section 58 and are released from the pressing by the upper and lower rollers, the first and second piece strings 51 and 52 separate from each other. The separated first and second piece strings 51 and 52 each return to a bendable state. The first and second piece strings 51 and 52 that returned to a bendable state are both bent in the same direction (toward the bottom plate side of the second piece 54) inside the up/down section 4, and are housed inside the columnar support section 2. At this time, the first piece string 51 is housed in a state in which the first piece string 51 is substantially parallel to the second piece string 52.

A wrist section 6 is attached to the tip of the arm section 5. The wrist section 6 includes the fourth to sixth joints J4 to J6. The fourth to sixth joints J4 to J6 have three axes of rotation RA4 to RA6 that are orthogonal to each other. The fourth joint J4 is a torsion rotational joint that rotates on the fourth axis of rotation RA4 that approximately matches the extension and contraction center axis RA3. The end effector is oscillatingly rotated by rotation of the fourth joint J4. The fifth joint J5 is a bending rotational joint that rotates on the fifth axis of rotation RA5 perpendicular to the fourth axis of rotation RA4. The end effector is tilted and rotated to front and rear by rotation of the fifth joint J5. The sixth joint J6 is a torsion rotational joint that rotates on the sixth axis of rotation RA6 perpendicular to the fourth axis of rotation RA4 and the fifth axis of rotation RA5. The end effector is axially rotated by rotation of the sixth joint J6.

The end effector is attached to an adapter 7 provided at a lower part of the rotating section of the sixth joint J6 of the wrist section 6. The end effector is moved to a given position by the first, second and third joints J1, J2 and J3, and is disposed in a given posture by the fourth, fifth and sixth joints J4, J5 and J6. In particular, the length of the extension and retraction distance of the arm section 5 of the third joint J3 allows the end effector to reach objects in a wide range from a position close to the base 1 to a position far from the base 1. The third joint J3 is characterized by linear extension and retraction motions realized by the linear extension and retraction mechanism constituting the third joint J3, and by the length of the extension and retraction distance thereof.

Figure 5A:
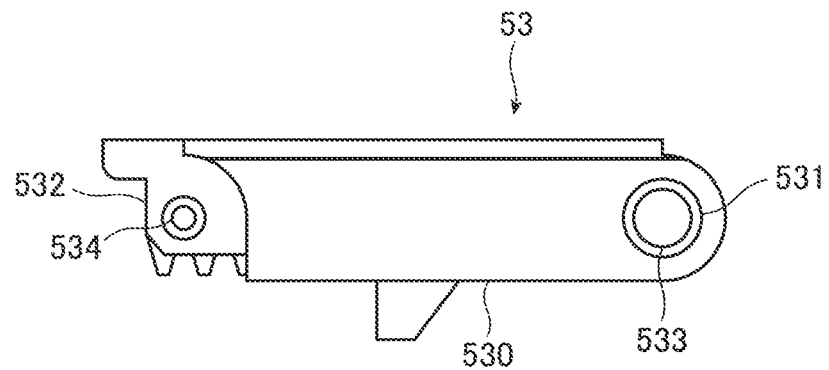
FIGS. 5A and 5B are views illustrating a first piece that is shown in FIG. 3.
Figure 5B:
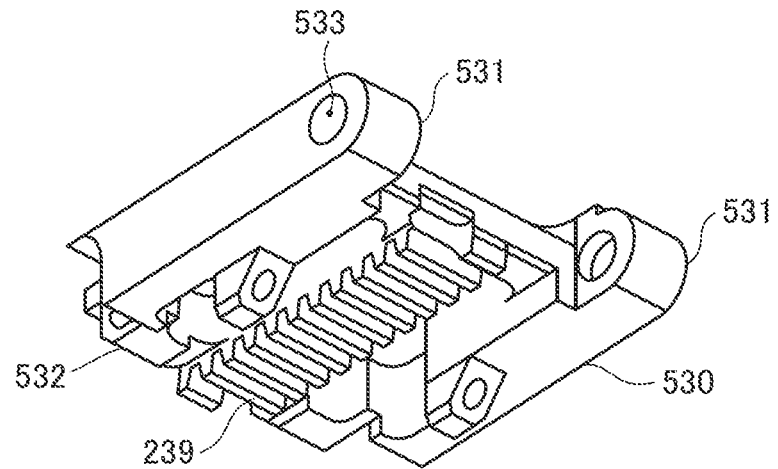

FIG. 5A is a side view of the first piece 53 which constitutes the first piece string 51. FIG. 5B is a perspective view of the first piece 53. A main body part 530 of the first piece 53 has a rectangular flat plate shape, with a pair of bearing blocks 531 being separately provided on both sides at the front end thereof, and a bearing block 532 being provided in the center at the rear end of the main body part 530. The bearing block 532 at the rear end of another first piece 53 is fitted between the pair of bearing blocks 531 at the front end of the first piece 53. A shaft hole 533 penetrating in parallel with the width direction of the first piece 534 penetrating in parallel with the width direction of the first piece 53 is also formed in the bearing block 532 at the rear end. In each pair of successive first pieces 53, the bearing block 532 of the first piece 53 at the front is inserted between the bearing blocks 531 of the first piece 53 at the rear, whereby the shaft holes 533 and the shaft hole 534 communicate, and a shaft is inserted.

Figure 6A:
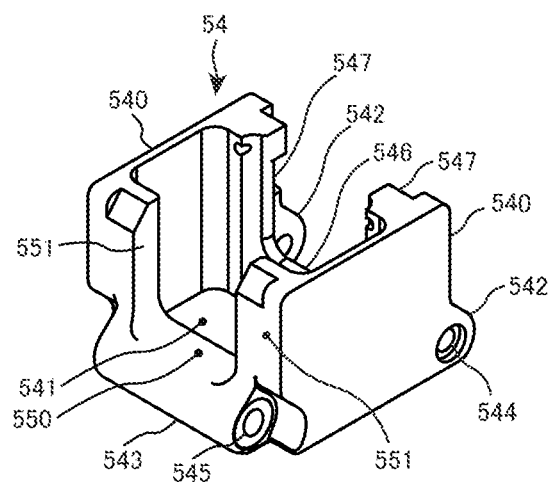
FIGS. 6A, 6B, 6C, 6D, 6E, and 6F are views illustrating a second piece that is shown in FIG. 3.
Figure 6B:
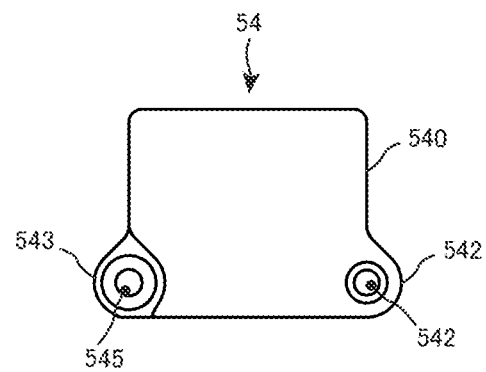
Figure 6C:
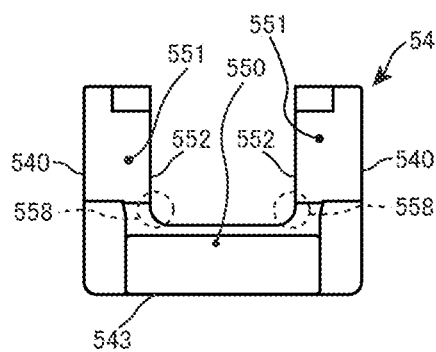
Figure 6D:
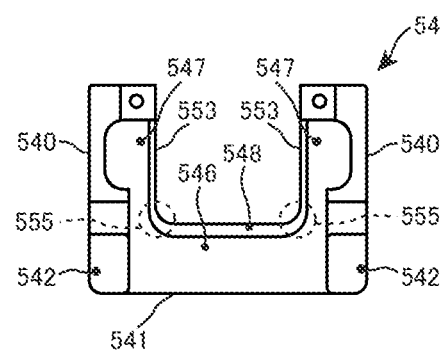
Figure 6E:
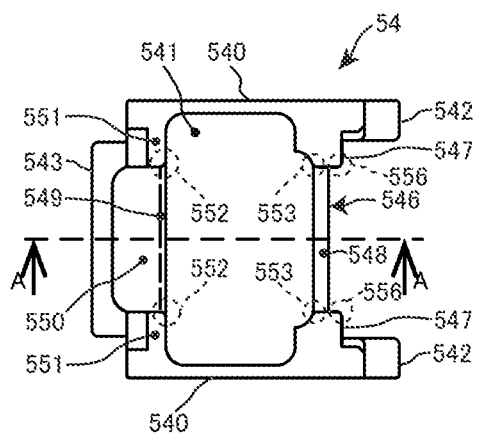
Figure 6F:
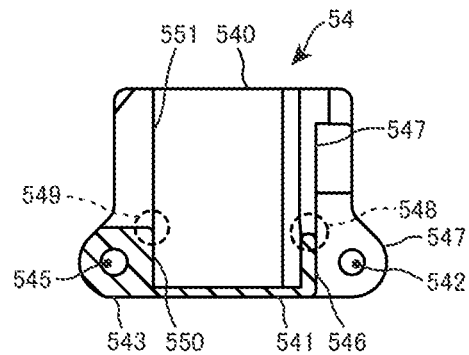

FIG. 6A is a perspective view of the second piece 54. FIG. 6B is a side view of the second piece 54. FIG. 6C is a rear view of the second piece 54. FIG. 6D is a front view of the second piece 54. FIG. 6E is a plan view of the second piece 54. FIG. 6F is a cross-sectional view along a line A-A of the second piece 54. The second piece 54 has an overall shape of an U-shaped groove frame (saddle shape) in cross section, that is composed of a bottom plate 541 and a pair of side plates 540. A bearing block 543 that supports a bearing 545 is provided at the width center of the rear end of the bottom plate 541. A pair of bearing blocks 542 that support a bearing 544 are separately provided on both sides at the front end of the bottom plate 541. In each pair of successive second pieces 54, the bearing block 543 of the second piece 54 at the rear is inserted between the pair of bearing blocks 542 of the second piece 54 at the front. The bearings 544 of the bearing blocks 542 of the second piece 54 at the front communicate with the bearing 545 of the bearing block 543 of the second piece 54 at the rear. An unshown shaft is inserted into the communicating bearings 544 and 545. The pairs of successive second pieces 54 are rotatably connected to each other around the shaft. The second piece string 52 is bendable to the inner side (bottom plate 541 surface side), while on the opposite side, the pairs of successive second pieces 54 stop bending at a position at which the end faces of the side plates 540 thereof butt against each other to thereby cause the second piece string 52 to be linearly arranged.

At the front edge of the bottom plate 541 of the second piece 54, a protrusion section 546 is extended along the entire width in parallel with the width direction in a state in which the protrusion section 546 protrudes to the inner side. The protrusion section 546 supports a cable 100 together with the bearing block 543 at the rear end of the second piece 54 as described later. Note that the protrusion section 546 also has a function of reinforcing the second piece 54, and in this sense is also referred to as a "reinforcing rib". The height of the protrusion section 546 is configured to be equal to the height of the bearing block 543 at the rear end of the second piece 54. The protrusion section 546 that continues from the bottom plate 541 is extended along the height direction in a state in which the protrusion section 546 protrudes inward to the front edges of the two side plates 540. An inner edge of a bend portion 555 that bends from the protrusion section 546 of the bottom plate 541 to a protrusion section 547 of the side plate 540 forms an arc shape. A corner 548 of an edge part of an upper edge of the protrusion section 546 of the bottom plate 541 is chamfered, and preferably is round-chamfered. Likewise, corners 553 and 556 of an edge part of the protrusion section 547 of the side plates 540 are similarly chamfered, and preferably are round-chamfered.

The bearing block 543 is provided at the width center of the rear end of the second piece 54. The rear edge of the bearing block 543 is formed in an arc shape, and an inside edge 550 is formed in a rectangular shape. A protrusion section 551 that continues from the inside edge 550 of the bearing block 543 is extended along the height direction in a state in which the protrusion section 551 protrudes inward to the inner side of the two side plates 540. An inner edge part of a bend portion 558 that bends from the inner edge 550 of the bearing block 543 to the protrusion section 551 of the side plate 540 forms an arc shape. A corner 549 of the edge part of the inside edge 550 of the bearing block 543 is chamfered, and preferably is round-chamfered.

A power/control electrical cable to the three joints J4, J5 and J6 mounted in the wrist section 6 is routed so as to pass from inside the columnar support section 2 through the inside of the up/down section 4 and then inserted through the inside of the arm section 5 and arrive at the joints J4, J5 and J6. In order to correspond to expansion and contraction of the arm section 5, an expansion/contraction cable that has elasticity is adopted as the cable to thereby ensure that slackened cable does not twist and become entangled inside the second pieces 54, and the cable length is designed so as to generate a tensile force of a certain amount even when the arm section 5 is in a most contracted state.

Figure 7:
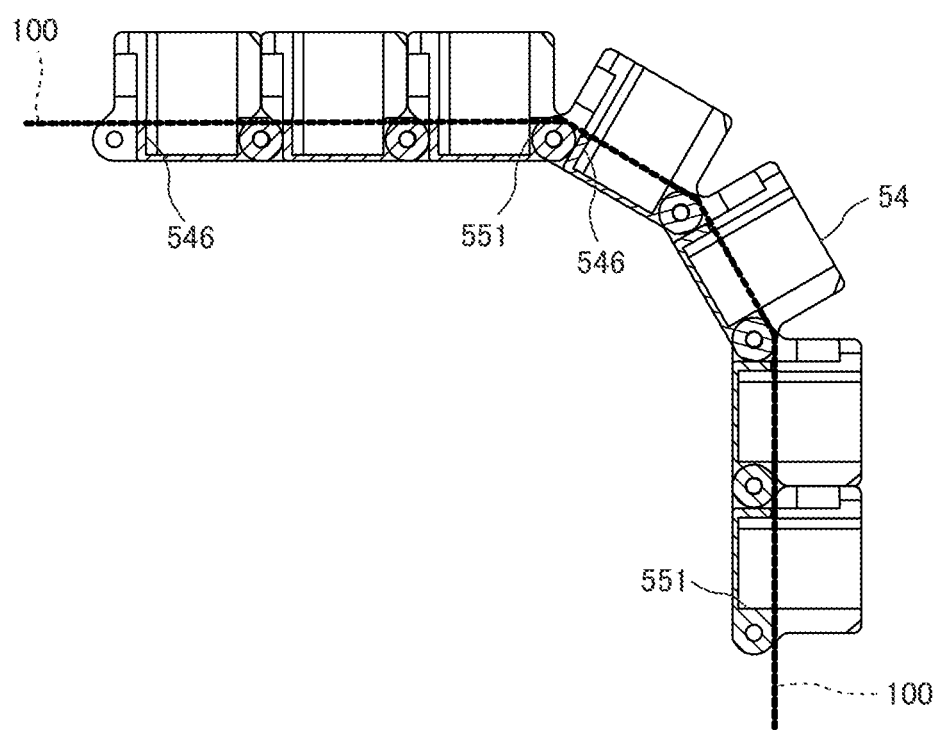
FIG. 7 is a view illustrating an electrical cable that is inserted through the inside of a second piece string shown in FIG. 3.

Because all the corners 548, 549, 552 and 553 of the edge parts of portions that protrude inward of the second piece 54 are chamfered, and the bend portions 555 and 558 are formed in an arc shape, and furthermore, the height of the protrusion section 546 is configured to be equal to the height of the bearing block 543, as illustrated in FIG. 7, the cable 100 is linearly installed, and the outer covering of the cable 100 slides in a smooth manner without catching on, in particular, the corners of these edge parts of the internal structure of the second pieces 54. Thus, it is possible to reduce damage to the cable 100 inside the second piece 54, and by that means also reduce the occurrence of a situation in which extension and retraction motions of the arm section 5 are impaired. These working effects are particularly noticeable in a situation in which, at a location at which the second piece string 52 bends by a large amount toward the columnar support section 2 in the up/down section 4, the cable 100 is pressed by the tensile force thereof against the corners 548 and 549 of the edge parts at the front and rear of the bottom plate 541.

Note that, although in the foregoing description it is described that the protrusion sections 546, 547, 550 and 551 are provided at the front and rear edges of the second piece 54, the locations of the protrusion sections are not limited to those positions, and for example a protrusion section may be provided at the center of the second piece 54 or in the vicinity thereof. Further, although it is described in the foregoing that the corners of edge parts of the protrusion sections 546, 547, 550 and 551 are chamfered, the corners of edge parts of these protrusion sections may be additionally coated with a self-lubricating resin such as polyacetal (POM), poly amide (PA) or polytetrafluoroethylene (PTFE), and the entire inner surface of the second pieces 54 may also be coated. Furthermore, a configuration may be adopted in which corners of edge parts of the protrusion sections are not chamfered, and instead the corners of the relevant edge parts are covered with a cap made of self-lubricating resin.

Figure 8A:
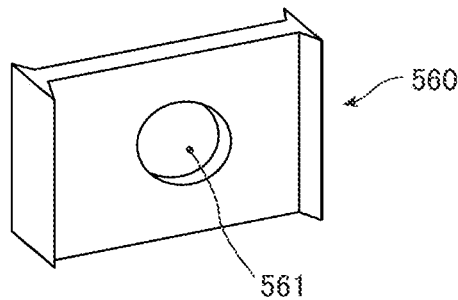
FIGS. 8A, 8B, and 8C are views illustrating an electrical cable guide plate that is mounted inside the second piece shown in FIG. 3.
Figure 8B:
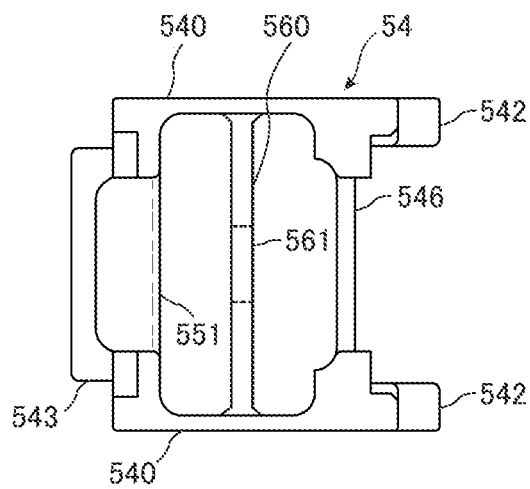
Figure 8C:
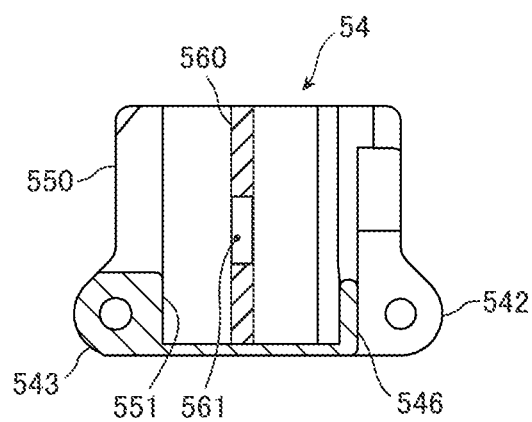

Further, as illustrated in FIG. 8, in addition to chamfering the corners of edge parts of the protrusion sections 546, 547, 550 and 551, or instead of chamfering the corners of the edge parts, a cable guide plate 560 made of self-lubricating resin having, at approximately the center thereof, a cable guide hole 561 through which a cable is inserted may be arranged parallel to the width direction at the center of the second piece 54 or in the vicinity of the center thereof.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST

54 . . . SECOND PIECE, 540 . . . SIDE PLATE, 541 . . . BOTTOM PLATE, 546, 547, 550, 551 . . . PROTRUSION SECTION, 548, 549, 552, 553 . . . CHAMFERED EDGE PART CORNER

The invention claimed is:

1. A linear extension and retraction mechanism, comprising:
   a plurality of first pieces having a flat-plate shape, the first pieces being bendably connected to each other at front and rear ends;
   a plurality of second pieces having a cross-sectional U-shaped groove frame shape, the second pieces being bendably connected to each other at front and rear ends of a bottom plate;
   a head section that joins a leading first piece of the plurality of first pieces and a leading second piece of the plurality of second pieces, with the first and second pieces becoming linearly rigid when the first pieces are joined to the second pieces, and the first and second pieces returning to a bent state when separated from each other; and
   a support section that supports the first and second pieces movably to front and rear, and causes the first and second pieces to join when the first and second pieces move frontward, and causes the first and second pieces to separate when the first and second pieces move rearward while being in the bent state;
   wherein
   a protrusion section that protrudes inward is extended in a width direction in the bottom plate of each of the second pieces, and a corner of an edge part of the protrusion section is chamfered.

2. The linear extension and retraction mechanism according to claim 1, wherein a bearing block is provided at a width center of one end of each of the second pieces, and a corner of an edge part of the bearing block is chamfered.

3. The linear extension and retraction mechanism according to claim 2, wherein a height of the protrusion section is equal to a height of the bearing block.

4. The linear extension and retraction mechanism according to claim 1, wherein the protrusion section is bendingly provided from the bottom plate to a side plate, and a corner of an edge part of a side plate portion of the protrusion section is chamfered.

5. The linear extension and retraction mechanism according to claim 1, wherein an inner edge part of a portion that bends from the bottom plate to the side plate of the protrusion section forms an arc shape.

6. A robot arm mechanism in which a columnar support section having a turning rotational joint is supported on a base, an up/down section having an upward/downward rotational joint is mounted on the columnar support section, a linear extension and retraction mechanism comprising an arm section having linear elasticity is provided on the up/down section, a wrist section to which an end effector is attachable is mounted at a tip of the arm, and at least one rotational joint for changing a posture of the end effector is mounted in the wrist section, wherein:
   the linear extension and retraction mechanism comprises:
   a plurality of first pieces having a flat-plate shape, the first pieces being bendably connected to each other at front and rear ends,
   a plurality of second pieces having a cross-sectional U-shaped groove frame shape, the second pieces being bendably connected to each other at front and rear ends of a bottom plate,
   a head section that joins a leading first piece of the plurality of first pieces and a leading second piece of the plurality of second pieces, with the first and second pieces becoming linearly rigid and constituting the arm section when the first pieces are joined to the second pieces, and the first and second pieces returning to a bent state when separated from each other, and
   a support section that supports the first and second pieces movably to front and rear, and causes the first and second pieces to join when the first and second pieces move frontward, and causes the first and second pieces to separate when the first and second pieces move rearward while being in the bent state;
   a power/control electrical cable to a rotational joint of the wrist section is inserted through inside of the connected second pieces; and
   a protrusion section that protrudes inward is extended in a width direction in the bottom plate of each of the second pieces, and a corner of an edge part of the protrusion section is chamfered.

* * * * *